United States Patent [19]

Wallace, Jr.

[11] 4,311,874

[45] Jan. 19, 1982

[54] TELECONFERENCE MICROPHONE ARRAYS

[75] Inventor: Robert L. Wallace, Jr., Warren, N.J.

[73] Assignee: Bell Telephone Laboratories, Incorporated, Murray Hill, N.J.

[21] Appl. No.: 104,375

[22] Filed: Dec. 17, 1979

[51] Int. Cl.[3] .......................... H04M 1/20; H04R 3/02

[52] U.S. Cl. .............................. 179/1 CN; 179/1 DM

[58] Field of Search ........... 179/1 CN, 1 DM, 121 D, 179/1 HF, 1 VC, 1 P, 18 BC, 1 AT; 343/742; 181/125

[56] References Cited

U.S. PATENT DOCUMENTS

| | | | |
|---|---|---|---|
| 2,810,786 | 10/1957 | Spandock et al. | 179/1 DM |
| 3,502,811 | 3/1970 | Schroeder et al. | 179/1 DM |
| 4,117,491 | 9/1978 | Hanna et al. | 343/742 |
| 4,131,760 | 12/1978 | Christensen et al. | 179/1 CN |

FOREIGN PATENT DOCUMENTS

| | | | |
|---|---|---|---|
| 429022 | 5/1935 | United Kingdom . | |
| 996002 | 6/1965 | United Kingdom . | |
| 2008359 | 5/1979 | United Kingdom | 179/1 CN |

OTHER PUBLICATIONS

Bell System Technical Journal, S. A. Schelkwnoff, "A Mathematical Theory of Linear Arrays," Jan. 1943, vol. 22, pp. 80–107.

Acoustical Engineering, "Acoustical Radiating Systems", 1957, pp. 35–39.

Foundations of Acoustics, Basic Mathematics and Basic Acoustics, 1971, pp. 58–63.

Proceedings of the IRE and Waves and Electrons, C. L. Dolph, "A Current Distribution for Broadside Arrays Which Optimizes the Relationship Between Beam Width and Side Lobe Level", Jun. 1946, pp. 335–348.

*Primary Examiner*—Bernard Konick

*Assistant Examiner*—J. A. Popek

*Attorney, Agent, or Firm*—Robert O. Nimtz

[57] ABSTRACT

A directional array of acoustic transducers is disclosed. The acoustic transducers are arranged colinearly and in pairs symmetrically about a center line of the directional array. The distances of the acoustic transducers on either side of the center line of the array are neither linear nor monotonic. These distances are calculated using a recursive far field response formula which effectively reduces sidelobe magnitudes to a desired design amplitude envelope. The response produced is highly directional, comprising one main lobe and a plurality of sidelobes each less than the desired design envelope, which is substantially lower than the main lobe but of arbitrary (e.g., stepped) shape.

19 Claims, 11 Drawing Figures

TELECONFERENCE MICROPHONE ARRAYS

BACKGROUND OF THE INVENTION

1. Field of the Invention

This invention relates to arrays of electrical transducers for radiant wave energy, and in particular, to directional arrays of microphones for multiparticipant conferences.

2. Description of the Prior Art

When one group of people wishes to confer with another group located some distance apart, one solution would be to hold a teleconference. In other circumstances, it may be desirable to put a panel discussion on a public address system. However, a suitable means of obtaining the sound signals equally well from all the members in a group while rejecting the ambient noise signals in the conference room has remained a problem for some time.

One solution to this problem is to place several microphones and loudspeakers spread about the ceiling of the conference room. A second solution is to have each talker wear a lavalier microphone around the neck, or a lapel microphone. A third solution would be to have several microphones on the conference table. All of these above solutions produce undesirable levels of noise and echo.

In 1946 C. L. Dolph (Proceedings of the I.R.E. and Waves and Electrons, Vol. 34, No. 6, June, 1946, pp. 335–348.,) suggested that an array of microphones could be used to solve this problem. He suggested that by spacing the microphones equally apart and by adjusting their sensitivities according to Chebychev polynominal coefficients, a response comprising one main lobe of given magnitude and several substantially equal sidelobes of lesser magnitude could be obtained. The level of noise transmitted by the Dolph array is lower than the noise level in any of the solutions mentioned earlier. However, since only fractions of the sensitivities of the microphones are used, the array produces a response with a signal-to-noise ratio lower than it would be if the full sensitivity of each microphone were utilized. It is desirable to have an array that could produce the response pattern suggested by Dolph and yet utilize the full sensitivities of each microphone.

SUMMARY OF THE INVENTION

In accordance with the illustrative embodiment of the invention, an array of acoustic transducers, e.g., omnidirectional electret microphones or loudspeakers, are arranged colinearly and in pairs which are symmetrically and selectively located about a center line of the array. If an odd number of acoustic transducers is used, one of the acoustic transducers is placed on the center line of the array and the others are placed in pairs symmetrically about the center line.

The spacings between the microphone elements located on either side of the center of the array are nonuniform. Further, in the preferred embodiments, the full sensitivity of each of the microphones is used. The several microphone elements are connected in parallel and the combined signal is amplified and sent to a utilization means which may be a loudspeaker, a transmitter in a telephone set, a tape recorder, or the like. The ambient noise signals picked up by the microphones add incoherently while the speech signals add in phase. The result is that the array has a much higher signal-to-noise ratio than a single microphone or several arbitrarily placed single microphones.

The most desirable response pattern, comprising one main lobe of given amplitude and several sidelobes of substantially lesser amplitude, is obtained by recursively selecting spacings based on changes in response criteria. In one embodiment of the invention, the several sidelobe amplitudes are substantially equal. In another embodiment of the invention, sidelobe amplitudes can vary, but are always less than a desired amplitude. It is possible, using the response criteria approach, to shape the envelope of the sidelobe response pattern to any arbitrary shape such as, for example, to create a response null at a speaker location. In one such embodiment with stepped sidelobes, some sidelobes are fixed at a desired level allowing the other sidelobes to seek their minimum uniform level.

DETAILED DESCRIPTION

Figure 1:
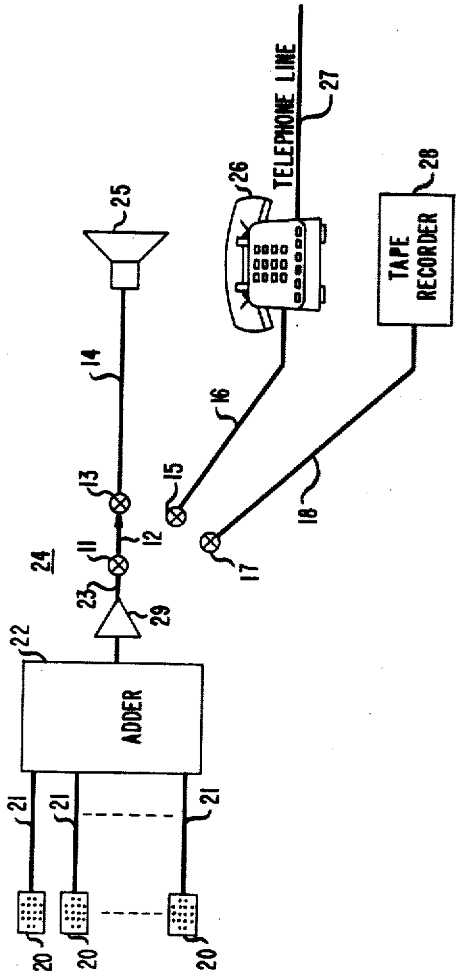
FIG. 1 is a general block diagram of a conference system using a microphone array.

Referring more particularly to FIG. 1, there is shown a general block diagram of microphone elements 20 connected in parallel through leads 21 to a signal adder circuit 22. The signal adder circuit 22 may be a combining network comprising one or more operational amplifiers of unit gain and operates simply to sum all of the signals at its input. The output from the adder 22 is amplified in amplifier 29 and connected by a lead 23 to a terminal 11 of switch 24. Switch 24 comprises an arm 12 which can be used to connect terminal 11 wth any one of many terminals 13, 15, . . . , 17. In the illustrative embodiment, lead 14 connects terminal 13 to a loudspeaker 25; lead 16 connects terminal 15 to a telephone set 26 and thence to a telephone line 27; and lead 18 connects terminal 17 to a tape recorder 28. Depending on the application, filters and balancing networks may be used (not shown in FIG. 1).

Figure 2:
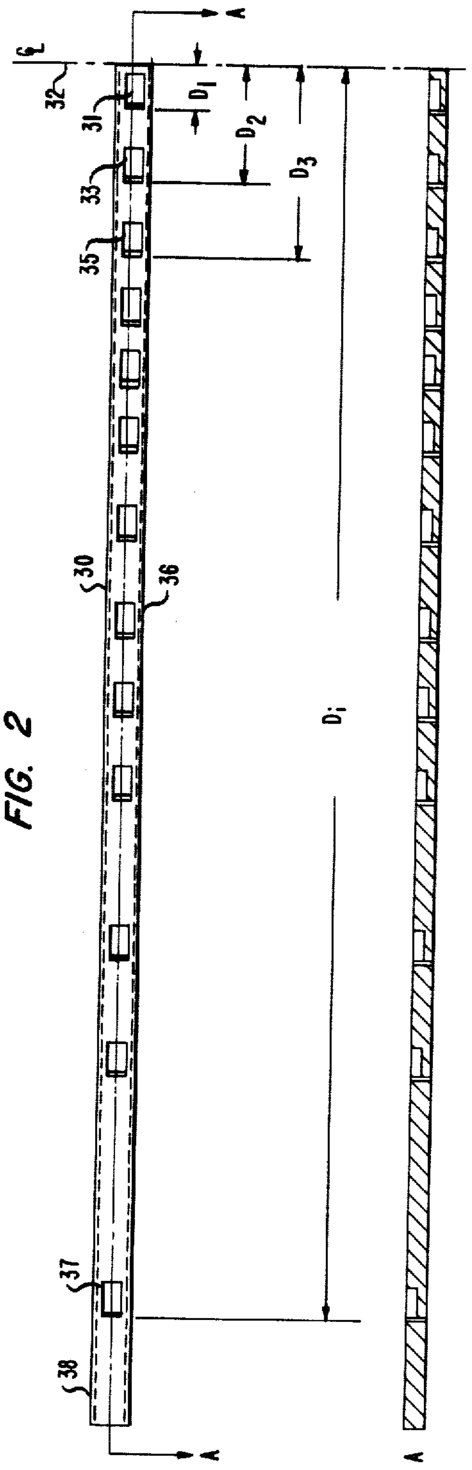
FIG. 2 is a detailed top and side view of a half section of a microphone array, showing spacings of the microphones in the array in accordance with the invention.

A detailed mechanical drawing of the top and side views of a half section of a microphone array 30 is shown in FIG. 2. Array 30 comprises a thin elongated support structure or housing 36 in which a plurality of electret microphones 31, 33, 35, . . . 37, are mounted. A first electret microphone 31 is located at a distance $D_1$ from the center line 32. A second electret microphone 33 is located at a distance $D_2$ from the center line 32. A third electret microphone 35 is located at a distance $D_3$ from the center line 32. Several additional microphones up to the $n^{th}$ microphone 37 are located at varying distances $D_i$ from the center line 32. An equal number of electret microphones are located at conjugate distances $D_1$, $D_2$, $D_3$, . . . $D_n$ on the other side of the center line 32 of the array (not shown).

The distances $D_1$ can be calculated by knowing the number of elements to be used, the velocity of sound in air, the desired length of the array, and a design frequency. For example, the velocity of sound in air is 1128 feet per second at 70 degrees Fahrenheit and a design frequency of 3500 Hz (voice range) can be chosen. The wavelength of sound is then given by $(1128 \div 3500)$ feet or 3.86 inches. If 28 elements are required, and if 7 wavelengths are chosen as the length of the array, the distance $D_{14}$ between the $14^{th}$ element and the center of the array will be $(7/2) \times 3.86$ inches, that is, 13.536 inches.

If the array is to be used in a perpendicular arrangement, the housing must be extended at one end of the array so as to fit into a pedestal (not shown). Such an extension 38 can be seen in FIG. 2.

Figure 3:
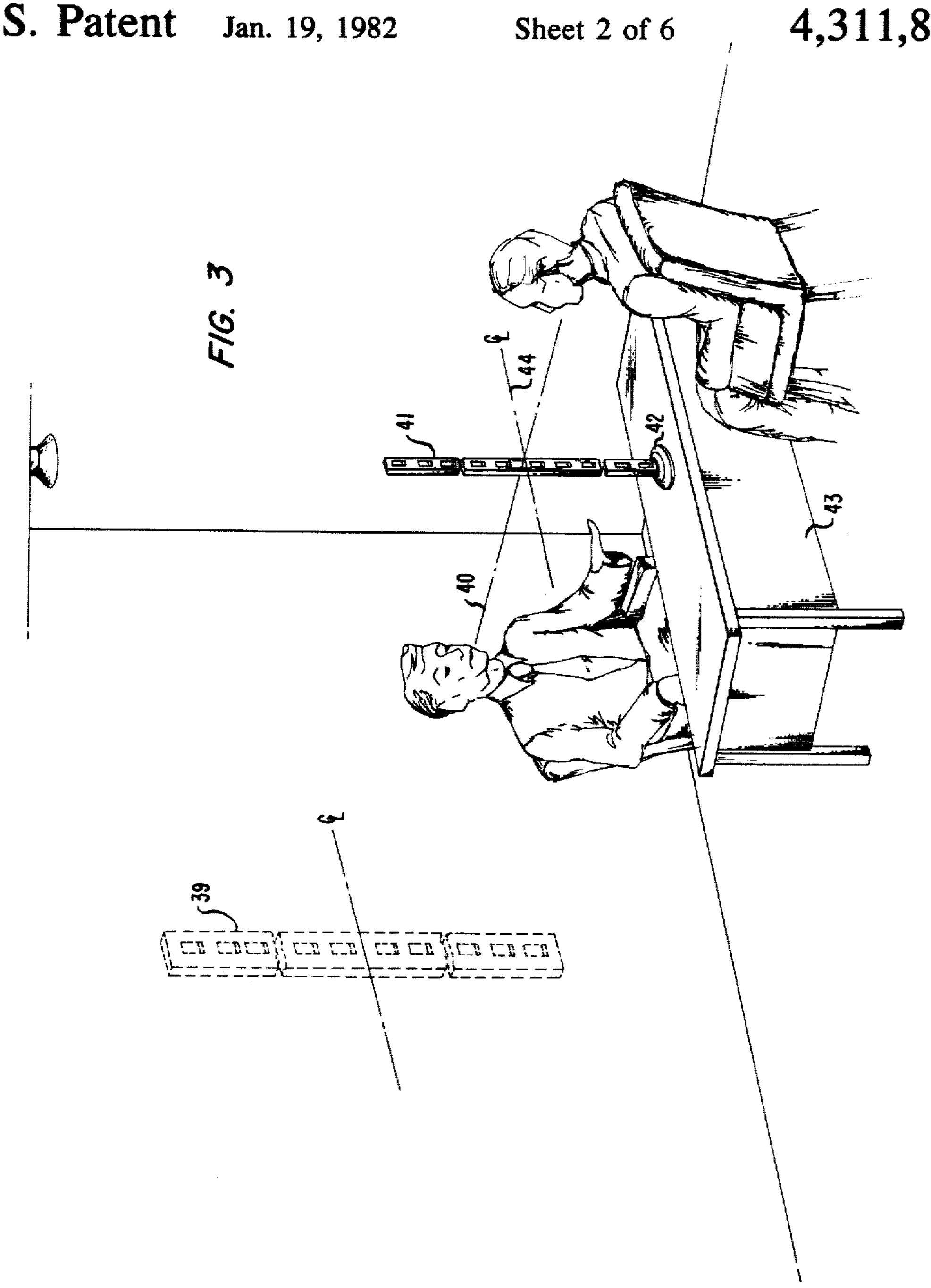
FIG. 3 shows a vertical disposition of the microphone array of FIG. 2 in a conference room.

FIG. 3 shows a microphone array set up for use in the perpendicular arrangement. The microphone array 41 is housed in a pedestal 42 and rests on a table 43. The array 41 is designed so that its center 44 corresponds with the average height 40 of the talkers' mouths. This will insure that the main lobe produced by the microphone array will efficiently pick up the desired voice signals that impinge on the array. The main lobe of the response pattern can be visualized as comprising a solid disc parallel to the table top. For noise and echo free transmission of sound, a loudspeaker should be placed directly above the microphone array, where the microphone response is minimal.

A basic assumption in the array design is the use of far field design criteria. By this is meant that acoustic waves from the several sound sources are assumed to arrive as a plane and to impinge each microphone equally. The several microphones are connected in parallel to a common output, so that all of the microphone outputs will add in phase; the ambient noise, however, will add incoherently. If the sound waves arrive at a small angle with the normal to the axis of the array, the sound waves will be attenuated somewhat. This attenuation will rapidly increase, to an effective null at the edge of the main response lobe, and will remain below a high constant attenuation level for all other angles of incidence. Consequently, if a loudspeaker is placed at either end of the array, a minimum sound signal from the loudspeaker will be transmitted by the array.

FIG. 3 also shows a microphone array 39, in phantom, mounted on a wall so that the center line of the array corresponds with the average height of the mouths of persons who maybe either seated or standing. Such an alternative arrangement clears the conference table of the microphone array and is less inhibiting to the users.

Figure 4:
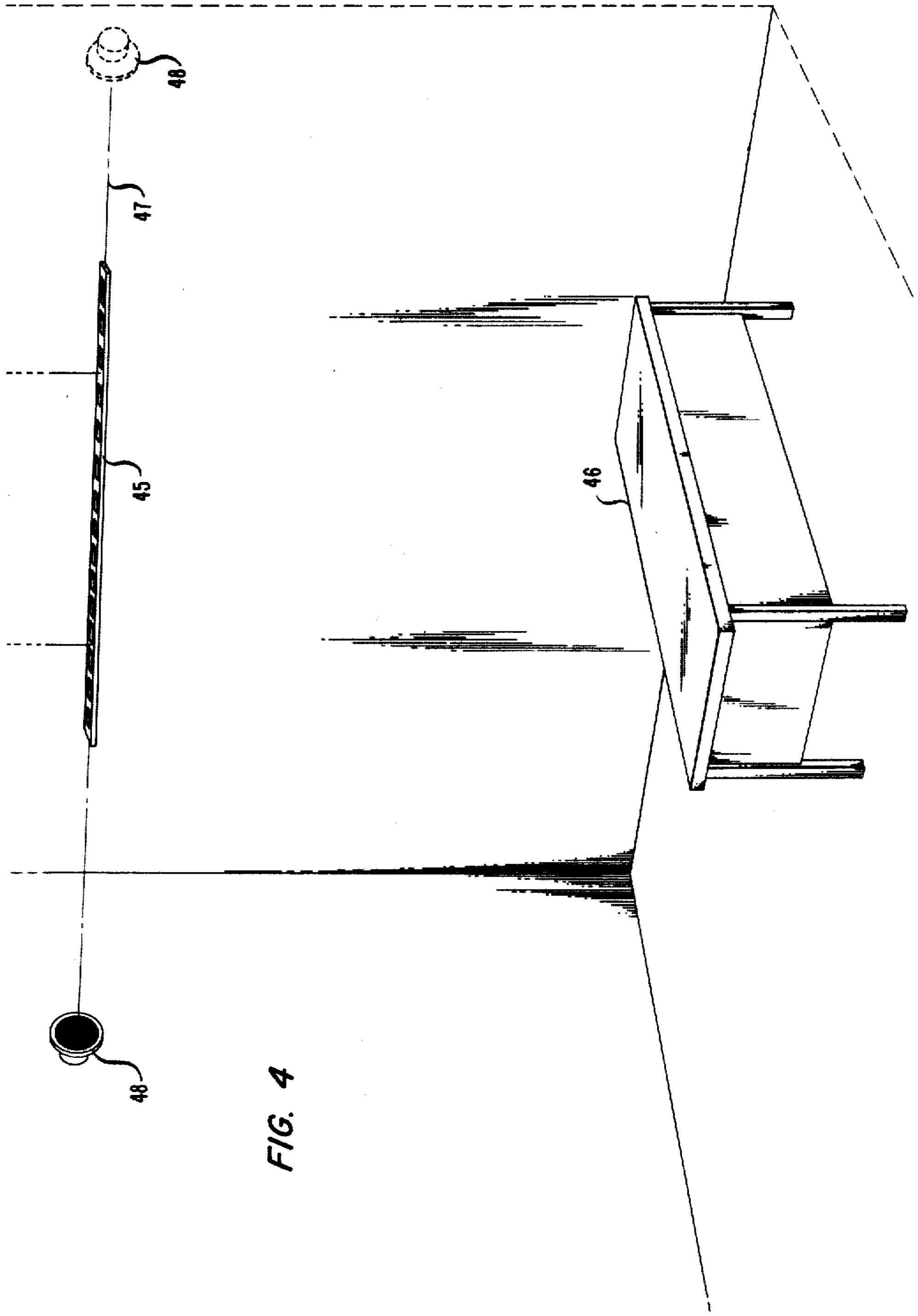
FIG. 4 shows a horizontal disposition of the microphone array of FIG. 2 in a conference room.

FIG. 4 shows another arrangement of the microphone array. In this arrangement a microphone array 45 is suspended at ceiling height so that axis 47 of the array 45 is parallel to the top of conference table 46 and the axis 47 of the array 45 is perpendicular to the length of conference table 46. Such an arrangement is desirable when the entire top of the conference table 46 is required for other uses. A horizontal arrangement is also useful when a long array is needed and the center of the long array used in the vertical arrangement would be considerably higher than the average height of the speakers' mouths.

In this horizontal arrangement there must necessarily be a tradeoff. The main beam in this case comprises a disc vertically disposed with respect to the top of the conference table 46. The amplitude of this main beam must be sufficiently large to pick up the sound sources from people seated at the ends of the conference table 46. Additionally, the width of the beam must be sufficiently large to pick up the sound sources from people seated at the sides of the conference table 46. It is well-known that the wider the beam, the more noise it will pick up. It is also known that by increasing the number of elements in the array, the noise can be reduced, the response can be made more directional, and the width of the beam can be reduced. Increasing the length of the array therefore both produces a more directional response and reduces noise.

It can readily be seen that, in the arrangement of FIG. 4, loudspeakers 48 should be placed at opposite ends of the array 45 (on the walls). This arrangement will minimize the transmission of sound from the loudspeakers through the array.

Figure 5:
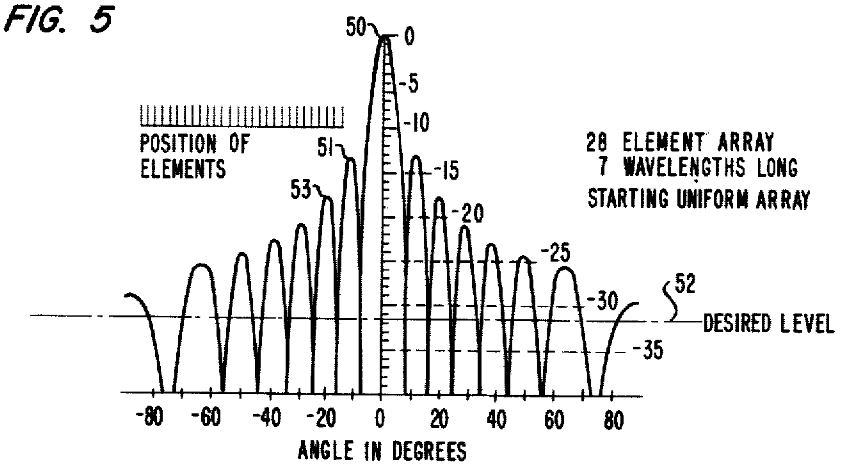
FIG. 5 shows the angular response pattern of a microphone array comprising 28 elements uniformly spaced and of equal sensitivities, the array being 7 wavelengths long.

Acoustical arrays such as those disclosed herein can be designed using the method of steepest descent. For illustrative purposes, this method will be discussed in connection with the design of a 28 element array, 7 wavelengths long, the elements being electret microphones of equal sensitivities. As shown in FIG. 5, if all 28 elements are equally spaced and located colinearly, the response pattern comprises one main lobe 50 and several sidelobes 51, 53, etc., of lesser amplitude. It can be seen that the largest sidelobe 51 is only about 13 dB lower than the main lobe 50. Furthermore, the second and other sidelobes vary in amplitude. It is well-known that these sidelobes contribute to the degradation in the quality of sound transmitted due to the ambient noise picked up by these sidelobes. It is desirable to be able to reduce or suppress these sidelobes. It is also known that if the sidelobes can be reduced to a level which is considerably lower than that of the main lobe, the sound transmitted can be rendered virtually noise-free.

As previously noted, C. L. Dolph suggested that by using Chebychev polynominal coefficients to weight the outputs of the microphone elements, the amplitudes of the sidelobes can be made substantially smaller and equal. However, in using this technique, the sensitivity of each microphone must be adjusted, making the process long and cumbersome. Furthermore, the full sensitivity of each microphone is not used.

Using the method of steepest descent to adjust microphone spacings, however, utilizes each microphone at its full sensitivity. In order to produce sidelobes of substantially equal amplitude, the spacings between the microphone elements and the center of the array are varied in pairs.

For example, for a 28 element array, 7 wavelengths long and with a design frequency of 3400 Hz, the first step is to determine the desired overall physical length of the array. Indeed, such a calculation was given above in connection with FIG. 2. The response of an equally spaced array is shown in FIG. 5. This response is calculated from the far field response formula:

$$R=(2/\Sigma A_i)\Sigma A_i \cos(2\pi D_i \sin J). \quad (1)$$

In this formula, J is the angle which the incident sound makes with the normal to the axis of the array; $A_i$ is the sensitivity of the $i^{th}$ microphone; R is the response of the array at any angle J; and $D_i$ is the distance of the $i^{th}$ microphone pair from the center of the array. This equation may be reduced to:

$$R=(2/N)\Sigma \cos(2\pi D_i \sin J) \quad (2)$$

when all the microphones are of substantially identical sensitivities.

Referring to the angular response pattern of FIG. 5, the first sidelobe has a peak at 51. The desired maximum level for all sidelobes is much lower and is shown at 52. It is the objective of the design procedure to find those spacings between the elements which will reduce the peak of the first and all other sidelobes to the level 52. This can be achieved by differentiating the response given by equation (2) at the peak of the first sidelobe with respect to the distance $D_i$ to yield the equation:

$$(\partial R/\partial D_i)=(-2/N)(2\pi \sin J)\sin(2\pi D_i \sin J). \quad (3)$$

The change in the distance $D_i$ by which each element is to be moved is proportional to the partial derivative of the response R with respect to the distance of the element from the center, i.e., $$\Delta D_i = P(\partial R/\partial D_i) \quad (4)$$

where P is the constant of proportionality. The change $\Delta R$ in response is given by $$\Delta R = \sum_{i=1}^{N/2} \frac{\partial R}{\partial D_i} \Delta D_i. \quad (5)$$

The relative change in the response can be found by dividing each side of equation (5) by R:

$$\frac{\Delta R}{R} = \frac{1}{R} \sum_{i=1}^{N/2} \frac{\partial R}{\partial D_i} \Delta D_i. \quad (6)$$

Substituting the value for $\partial R/\partial D_i$ from equation (3) and the value for $\Delta D_i$ from equation (4) into equation (6) and simplifying, the value of the relative change $\Delta R$ of the response can then be expressed as a fraction of the response R, $$\frac{\Delta R}{R} = \frac{4P}{RN^2}(2\pi \sin J)^2 \sum_{i=1}^{N/2} \sin^2(2\pi D_i \sin J). \quad (7)$$

The expression to the right of the summation sign in equation (7) contains N/2 terms each of which has an average value of ½ and therefore may be approximated to N/4. Equation (7) can then be further simplified:

$$\Delta R/R=(P/RN)(2\pi \sin J)^2. \quad (8)$$

If K is defined as being equal to $\Delta R/R$ to produce the desired level of sidelobes, equation (8) can be rearranged so that $$P=KRN/2\pi \sin J)^2. \quad (9)$$

The distance $\Delta D_i$ can then be calculated from equations (3), (4) and (9):

$$\Delta D_i=-2KR/2\pi \sin J)\sin(2\pi D_i \sin J). \quad (10)$$

After determining $\Delta D_i$ for each of the distances $D_1$, $D_2$, $D_3$, . . . $D_{14}$ the corresponding positions of the elements are adjusted to be $(D_1 \pm \Delta D_1)$, $(D_2 \pm \Delta D_2)$, $(D_3 \pm \Delta D_3)$, etc.

The response corresponding to the peak for the second sidelobe 53 is now determined. The relative change in the response desired is the difference between the peak 53 and the desired level of the sidelobes 52. To achieve this result, equation (10) is used as before to provide the new distances $(D_1 \pm \Delta D_1)$, $(D_2 \pm \Delta D_2)$, $(D_3 \pm \Delta D_3)$, . . . $(D_{14} \pm \Delta D_{14})$ by which the elements must again be varied. Peaks of the third and all other remaining sidelobes are calculated and the corresponding distances $(D_1 \pm \Delta D_i)$ for the microphone elements are found. However, after adjusting all these distances for each peak it will generally be found that the original length of the array will have been changed. At this length, the design frequency constraint (discussed earlier) will have been violated. It is therefore necessary to change the length of the array back to the original length so as to correspond with the design frequency. Consequently, the distance of each element from the center must be proportionately changed so that the length of the array will correspond to the desired length.

Figure 6:
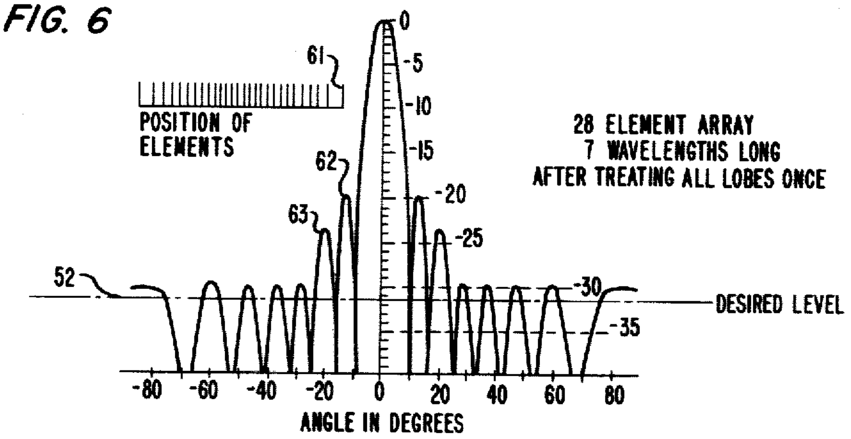
FIG. 6 shows the angular response pattern of the 28 element array of FIG. 5 after all sidelobes have been treated once and the spacings of the microphones adjusted accordingly.

In FIG. 6 the results of applying the recursive formula (10) and treating all the sidelobes once are shown by the changed positions 61 of the microphone elements. It can be seen also from FIG. 6 that the first sidelobe has a peak 62 which is still considerably higher than the desired level 52 for the sidelobes. This is also true of the second sidelobe which has a peak 63 and of all the other remaining sidelobes.

Figure 7:
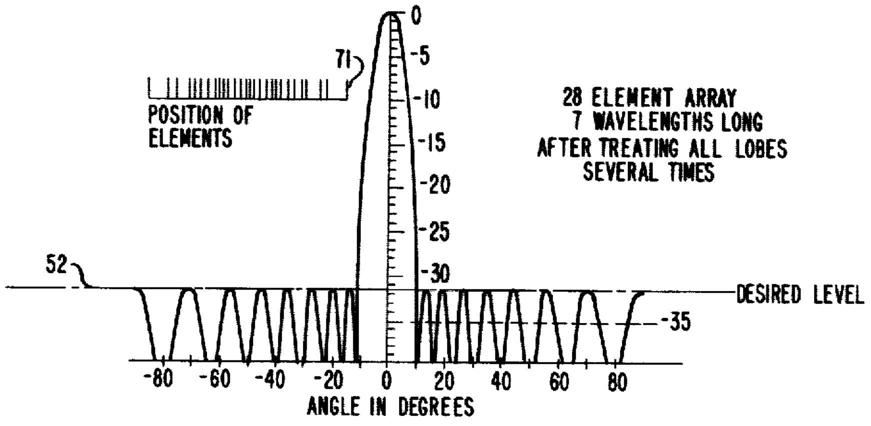
FIG. 7 shows the angular response pattern of the 28 element array of FIG. 5 after a plurality of iterations of spacing adjustments.

By repeating the process described above several times and normalizing the length of the array each time, a response pattern such as that shown in FIG. 7 will ultimately be obtained. FIG. 7 shows the positions 71 for the various microphone elements. It can be seen that all the sidelobes have been reduced to substantially equal amplitudes at level 52. FIG. 7 shows the minimum level 52 to which the sidelobes may be reduced, using the described method. Table 1 lists the positions 71 for the various microphone elements.

TABLE 1

| | |
|---|---|
| $D_1 = \pm 0.0677$ | $D_8 = \pm 1.3881$ |
| $D_2 = \pm 0.2260$ | $D_9 = \pm 1.6663$ |
| $D_3 = \pm 0.4308$ | $D_{10} = \pm 1.8887$ |
| $D_4 = \pm 0.6426$ | $D_{11} = \pm 2.0697$ |
| $D_5 = \pm 0.8231$ | $D_{12} = \pm 2.5321$ |
| $D_6 = \pm 0.9767$ | $D_{13} = \pm 2.8251$ |
| $D_7 = \pm 1.1443$ | $D_{14} = \pm 3.5000$ |

Figure 8:
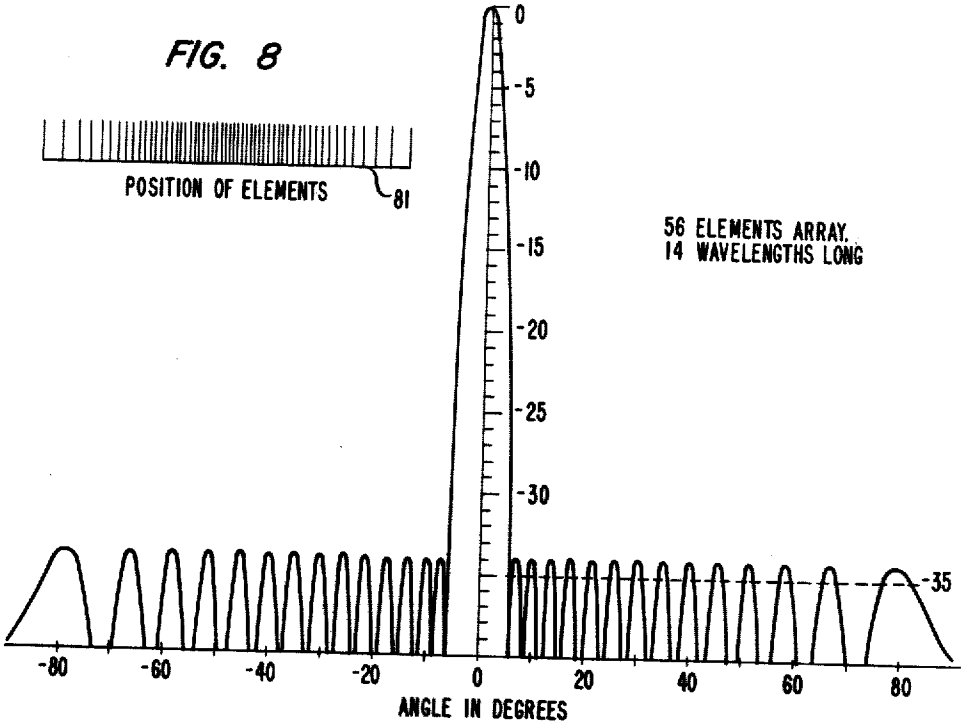
FIG. 8 shows the angular response pattern of a 56 element array, 14 wavelengths long.

FIG. 8 shows the positions 81 for a 56 element array which is 14 wavelengths long, designed by the described technique. The several sidelobes are substantially equal and considerably lower than the main lobe.

Table 2 lists the positions 81 for the acoustic transducers.

TABLE 2

| | |
|---|---|
| $D_1 = \pm 0.0823$ | $D_{15} = \pm 2.5108$ |
| $D_2 = \pm 0.2459$ | $D_{16} = \pm 2.7117$ |
| $D_3 = \pm 0.4076$ | $D_{17} = \pm 2.9257$ |
| $D_4 = \pm 0.5684$ | $D_{18} = \pm 3.1493$ |
| $D_5 = \pm 0.7312$ | $D_{19} = \pm 3.3772$ |
| $D_6 = \pm 0.8982$ | $D_{20} = \pm 3.6155$ |
| $D_7 = \pm 1.0685$ | $D_{21} = \pm 3.8786$ |
| $D_8 = \pm 1.2391$ | $D_{22} = \pm 4.1651$ |
| $D_9 = \pm 1.4087$ | $D_{23} = \pm 4.4633$ |
| $D_{10} = \pm 1.5798$ | $D_{24} = \pm 4.8000$ |
| $D_{11} = \pm 1.7565$ | $D_{25} = \pm 5.2023$ |
| $D_{12} = \pm 1.9405$ | $D_{26} = \pm 5.6453$ |
| $D_{13} = \pm 2.1289$ | $D_{27} = \pm 6.2611$ |
| $D_{14} = \pm 2.3185$ | $D_{28} = \pm 7.0000$ |

Figure 9:
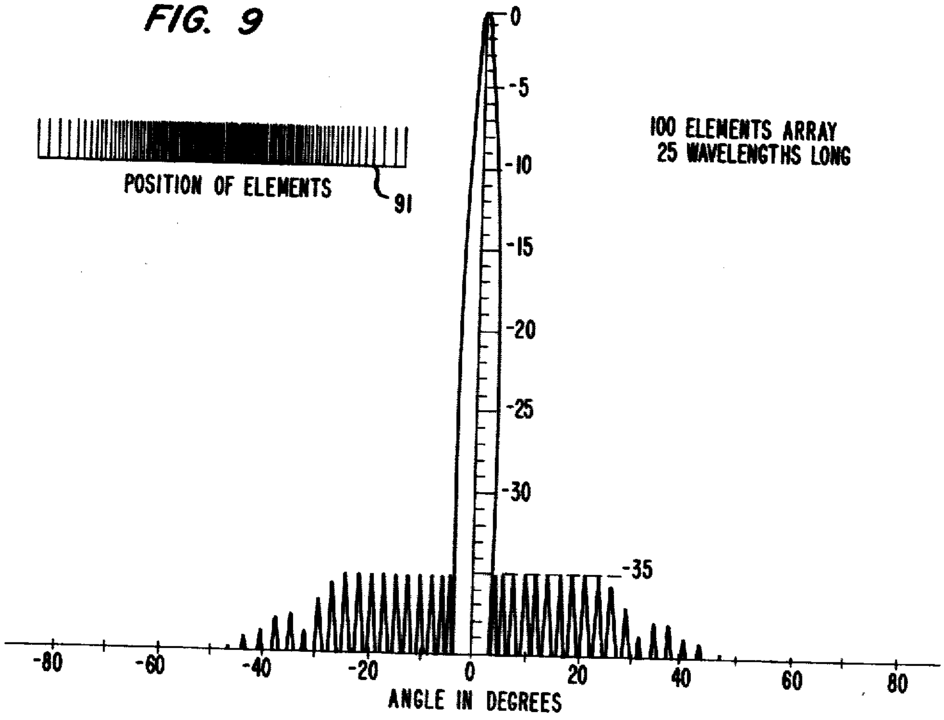
FIG. 9 shows the angular response pattern for 100 elements in a 25 wavelength long array.

FIG. 9 shows the positions 91 for a 100 element array which is 25 wavelengths long, also designed by the described technique. In this figure it can be seen that the sidelobes are not all equal. Indeed, several of the sidelobes beyond 25 degrees are attenuated substantially. Such a result, in fact, is desirable and aids rather than detracts from the objective of minimizing pickup from loudspeakers located at 90 degrees. Table 3 lists the positions 91 for the acoustic transducers.

TABLE 3

| | | | |
|---|---|---|---|
| $D_1 = \pm 0.0786$ | $D_{14} = \pm 2.1634$ | $D_{27} = \pm 4.4801$ | $D_{40} = \pm 7.5470$ |
| $D_2 = \pm 0.2360$ | $D_{15} = \pm 2.3296$ | $D_{28} = \pm 4.6780$ | $D_{41} = \pm 7.8540$ |
| $D_3 = \pm 0.3936$ | $D_{16} = \pm 2.4973$ | $D_{29} = \pm 4.8816$ | $D_{42} = \pm 0.1831$ |
| $D_4 = \pm 0.5516$ | $D_{17} = \pm 2.6668$ | $D_{30} = \pm 5.0809$ | $D_{43} = \pm 8.5398$ |
| $D_5 = \pm 0.7100$ | $D_{18} = \pm 2.8381$ | $D_{31} = \pm 5.3006$ | $D_{44} = \pm 8.9274$ |
| $D_6 = \pm 0.8689$ | $D_{19} = \pm 3.0114$ | $D_{32} = \pm 5.5172$ | $D_{45} = \pm 9.3474$ |
| $D_7 = \pm 1.0283$ | $D_{20} = \pm 3.1866$ | $D_{33} = \pm 5.7395$ | $D_{46} = \pm 9.8084$ |
| $D_8 = \pm 1.1882$ | $D_{21} = \pm 3.3636$ | $D_{34} = \pm 5.9688$ | $D_{47} = \pm 10.3423$ |
| $D_9 = \pm 1.3488$ | $D_{22} = \pm 3.5426$ | $D_{35} = \pm 6.2064$ | $D_{48} = \pm 11.0091$ |
| $D_{10} = \pm 1.5100$ | $D_{23} = \pm 3.7239$ | $D_{36} = \pm 6.4536$ | $D_{49} = \pm 11.8083$ |
| $D_{11} = \pm 1.6719$ | $D_{24} = \pm 3.9079$ | $D_{37} = \pm 6.7109$ | $D_{50} = \pm 12.5000$ |
| $D_{12} = \pm 1.8348$ | $D_{25} = \pm 4.0950$ | $D_{38} = \pm 6.9783$ | |
| $D_{13} = \pm 1.9985$ | $D_{20} = \pm 4.2857$ | $D_{39} = \pm 7.2564$ | |

Figure 10:
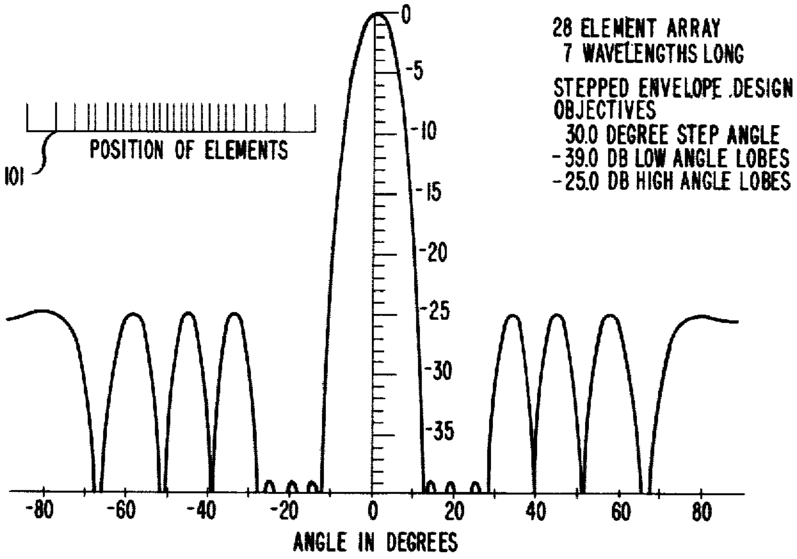
FIG. 10 shows the angular response pattern, with stepped sidelobes at 30 degrees, for a 28 element array, 7 wavelengths long.

FIG. 10 shows the positions 101 for a 28 element array which is 7 wavelengths long, using the described technique. It can be seen from this figure that the sidelobes are stepped at 30 degrees. Below 30 degrees the sidelobes are substantially equal and at −39 dB (below the main lobe); above 30 degrees the sidelobes are substantially equal and at −25 dB (below the main lobe). In reducing the sidelobes below 30 degrees the level −39 dB was arbitrarily selected. The other sidelobes may be allowed to seek their own minimum level such that the sidelobes are uniform. Such a response is useful to attenuate sound signals which impinge the array at an angle between 30 degrees and the first null. While 30 degrees has been shown as the angle at which the sidelobes are stepped, other angles may be selected depending on the use. Table 4 lists the positions 101 for the acoustic transducers.

TABLE 4

| | |
|---|---|
| $D_1 = \pm 0.0850$ | $D_8 = \pm 1.3413$ |
| $D_2 = \pm 0.2514$ | $D_9 = \pm 1.5385$ |
| $D_3 = \pm 0.4097$ | $D_{10} = \pm 1.8412$ |
| $D_4 = \pm 0.5689$ | $D_{11} = \pm 2.0280$ |
| $D_5 = \pm 0.7476$ | $D_{12} = \pm 2.3379$ |
| $D_6 = \pm 0.9491$ | $D_{13} = \pm 2.7751$ |
| $D_7 = \pm 1.1513$ | $D_{14} = \pm 3.5000$ |

Figure 11:
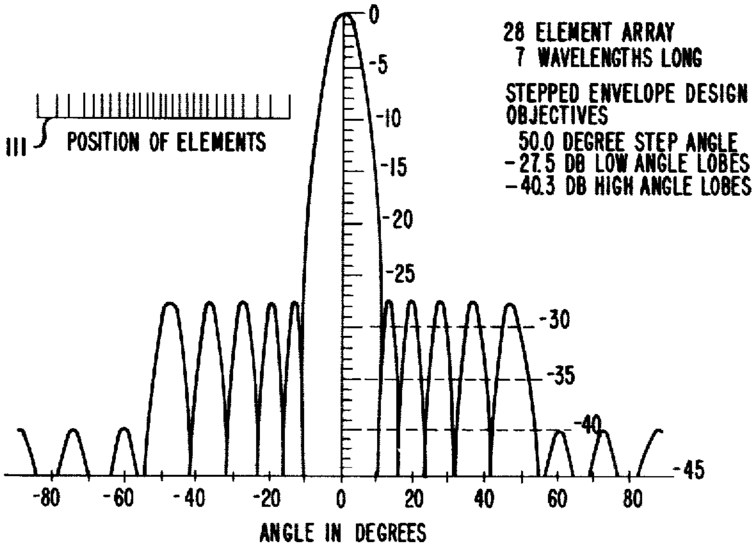
FIG. 11 shows the angular response pattern, with stepped sidelobes at 50 degrees, for a 28 element array 7 wavelengths long.

FIG. 11 shows the positions 111 for a 28 element array which is 7 wavelengths long, using the described technique. A stepped sidelobe angular response pattern is shown. Above 60 degrees, the sidelobes were designed to be substantially equal and at −40 dB (below the main lobe). Below 60 degrees, the sidelobes were designed to be substantially equal and at −27 dB (below the main lobe). As designed the sidelobes at −27 dB are not necessarily at their minimum; they may be allowed to seek their minimum in another embodiment. Such a stepped angular response is useful to attenuate incident sound sources having an angle larger than 60 degrees with the normal to the array. Such an arrangement can be useful to further suppress the loudspeaker signals discussed earlier in connection with FIG. 7. Table 5 lists the positions 111 for the acoustic transducers of FIG. 11.

TABLE 5

| | |
|---|---|
| $D_1 = \pm 0.0804$ | $D_8 = \pm 1.4691$ |
| $D_2 = \pm 0.2580$ | $D_9 = \pm 1.7076$ |
| $D_3 = \pm 0.4601$ | $D_{10} = \pm 1.9268$ |
| $D_4 = \pm 0.6579$ | $D_{11} = \pm 2.1986$ |
| $D_5 = \pm 0.8372$ | $D_{12} = \pm 2.5974$ |
| $D_6 = \pm 1.0129$ | $D_{13} = \pm 2.9634$ |
| $D_7 = \pm 1.2205$ | $D_{14} = \pm 3.5000$ |

Using the described technique, the spacings between acoustic transducers may be varied to produce responses with different envelopes of the sidelobes from those described above. One such envelope may be a straight line with either positive or negative slopes.

The principles outlined earlier are applicable also to colinear arrays of acoustic transducers that are equally spaced with different sensitivities (not illustrated). The different sensitivities are obtained by weighting the acoustic transducers electronically. Whereas the Dolph method, outlined earlier, produces sidelobes that are substantially equal, the technique outlined in this invention can be used to produce arbitrary sidelobe envelopes, e.g., stepped sidelobes. Such stepped sidelobes were discussed in connection with FIGS. 10 and 11.

Furthermore, the principles outlined earlier are applicable also to colinear arrays of acoustic transducers that combine varying the distances between the acoustic transducers and varying the sensitivities of the acoustic transducers (not illustrated). Such a combined technique can be used to reduce the level of sidelobes more than either technique could severally.

While a colinear array has been described, several other configurations can easily be constructed to produce the same desirable results. Some of these will now be outlined (not illustrated). The method of steepest descent has been used to determine the positions of microphone elements in an arrangement comprising two perpendicular arrays of microphones so as to produce substantially the same response pattern as that of a square array, e.g., a pencil beam. Such an arrangement finds applications in the field of radio astronomy. Another embodiment comprises cylindrical arrays. Cylindrical arrays may be visualized as comprising microphones housed in recesses along an arc of the circumference of a cylinder, hollow or solid, with several such layers parallel to the ends of the cylinder. The parallel layers are nearer one another than the ends of the cylinder. The response of such an array comprises a directional beam that is restricted in width both horizontally and vertically. One use for such an array lies in underwater sound systems because the full sensitivities of the microphones are used, thereby eliminating the cumbersome old method of adjusting the sensitivities of individual microphones.

I claim:

1. A microphone array comprising a plurality of microphone elements arranged in a colinear array

CHARACTERIZED IN THAT the spacings between adjacent pairs of said elements is nonuniform, and the distance between any of said elements and the center of said array is given by the application of the recursive formulae:

$$D'_i = D_i - \Delta D_i$$

$$\Delta D_i = -2KR/(2\pi \mathrm{Sin}J)\mathrm{Sin}(2\pi D_i \mathrm{Sin}J),$$

where,

R=response of said array,

K=ΔR/R, desired fractional change in response,

ΔR=desired change in response,

J=angle between arriving incident sound and the normal to said array, $D_i$=initial distance of the $i^{ith}$ element from the center of said array, and $D'_i$=final distance of the $i^{ith}$ element from the center of said array.

2. The microphone array according to claim 1 further

CHARACTERIZED IN THAT the elements of said array are displaced symmetrically around the center line of said array.

3. The microphone array according to claim 2

CHARACTERIZED BY a support structure, and means for mounting said microphone elements in said structure to support said microphones.

4. The microphone array according to claim 3

CHARACTERIZED IN THAT said structure is self-supporting.

5. The microphone array according to claim 3 further

CHARACTERIZED IN THAT said structure is mounted on a wall.

6. The microphone array according to claim 3 further

CHARACTERIZED BY means for suspending said structure from a ceiling so that the array is parallel to said ceiling.

7. The microphone array according to claim 1 further

CHARACTERIZED IN THAT said elements comprise omnidirectional electret microphones.

8. An array comprising a plurality of acoustic transducers arranged colinearly

CHARACTERIZED IN THAT the spacings between said acoustic transducers and the center of said array are monuniform, such that said array produces a response pattern with one main lobe of a given amplitude and a plurality of sidelobes having a preselected envelope with lesser amplitudes.

9. The array according to claim 8 further

CHARACTERIZED IN THAT said colinear arrangement comprises a plurality of pairs of acoustic transducers placed symmetrically about said center of said arrangement.

10. The array according to claim 8 further

CHARACTERIZED IN THAT said spacings of said acoustic transducers from said center of said array are determined by the following formulae:

$$R = (2/\Sigma A_i)\Sigma A_i \mathrm{Cos}(2\pi D_i \mathrm{Sin}J),$$

$$\Delta R = P/\Sigma A_i(2\pi \mathrm{Sin}J)^2,$$

$$P = KR\Sigma A_i/(2\pi \mathrm{Sin}J)^2,$$

and $$\Delta D_i = -2KR/2\pi \mathrm{Sin}J)\mathrm{Sin}(2\pi D_i \mathrm{Sin}J),$$

where, $$D_i' = D_i - \Delta D_i$$

R=response of said array, $A_i$=sensitivity of the $i^{th}$ transducer of said plurality of transducers, $D_i$=distance of the $i^{th}$ pair of said transducers from the center of said array, J=angle between arriving incident sound and the normal to said array, ΔR=desired change in response, P=constant of proportionality, K=ΔR/R, desired fractional change in response, $D_i'$=final distance of the $i^{th}$ pair from the center of said array.

11. A colinear arrangement of 28 microphones of substantially equal sensitivities

CHARACTERIZED IN THAT pairs of said microphones are located symmetrically about a center line of the arrangement, and the distances, in wavelengths, from the center line to members of each pair is given by:

$D_1=\pm0.0677$, $D_2=\pm0.2260$, $D_3=\pm0.4308$, $D_4=\pm0.6426$, $D_5=\pm0.8231$, $D_6=\pm0.9767$, $D_7=\pm1.1443$, $D_8=\pm1.3881$, $D_9=\pm1.6663$, $D_{10}=\pm1.8687$, $D_{11}=\pm2.0697$, $D_{12}=\pm2.5321$, $D_{13}=\pm2.8251$, and $D_{14}=\pm3.5000$.

12. A colinear arrangement of 56 microphones of substantially equal sensitivities

CHARACTERIZED IN THAT pairs of said microphones being located symmetrically about a center line of the arrangement, and the distances, in wavelengths, from the center line of each number of said pairs being given by:

$D_1=\pm0.0823$, $D_2=\pm0.2459$, $D_3=\pm0.4076$, $D_4=\pm0.5684$, $D_5=\pm0.7312$, $D_6=\pm0.8982$, $D_7=\pm1.0685$, $D_8=\pm1.2391$, $D_9=\pm1.4087$, $D_{10}=\pm1.5798$, $D_{11}=\pm1.7565$, $D_{12}=\pm1.9405$, $D_{13}=\pm1.289$, $D_{14}=\pm2.3185$, $D_{15}=\pm2.5108$, $D_{16}=\pm2.7117$, $D_{17}=\pm2.9257$, $D_{18}=\pm3.1493$, $D_{19}=\pm3.3772$, $D_{20}=\pm3.6155$, $D_{21}=\pm3.8786$, $D_{22}=\pm4.1651$, $D_{23}=\pm4.4633$, $D_{24}=\pm4.8000$, $D_{25}=\pm5.2023$, $D_{26}=\pm5.6453$, $D_{27}=\pm6.2611$, and $D_{28}=\pm7.0000$.

13. A colinear arrangement of 100 microphones of substantially equal sensitivities

CHARACTERIZED IN THAT pairs of said microphones being located symmetrically about a center line of the arrangement, and the distances, in wavelengths, from the center line of each member of said pairs being given by:

$D_1=\pm0.0786$, $D_2=\pm0.2360$, $D_3=\pm0.3936$, $D_4=\pm0.5516$, $D_5=\pm0.7100$, $D_6=\pm0.8689$, $D_7=\pm1.0283$, $D_8=\pm1.1882$, $D_9=\pm1.3488$, $D_{10}=\pm1.5100$, $D_{11}=\pm1.6719$, $D_{12}=\pm1.8348$, $D_{13}=\pm1.9985$, $D_{14}=\pm2.1634$, $D_{15}=\pm2.3296$, $D_{16}=\pm2.4973$, $D_{17}=\pm2.6668$, $D_{18}=\pm2.8381$, $D_{19}=\pm3.0114$, $D_{20}=\pm3.1866$, $D_{21}=\pm3.3636$, $D_{22}=\pm3.5426$, $D_{23}=\pm3.7239$, $D_{24}=\pm3.9079$, $D_{25}=\pm4.0950$, $D_{26}=\pm4.2857$, $D_{27}=\pm4.4801$, $D_{28}=\pm4.6788$, $D_{29}=\pm4.8816$, $D_{30}=\pm5.0889$, $D_{31}=\pm5.3006$, $D_{32}=\pm5.5172$, $D_{33}=\pm5.7395$, $D_{34}=\pm5.9688$, $D_{35}=\pm6.2064$, $D_{36}=\pm6.4536$, $D_{37}=\pm6.7109$, $D_{38}=\pm6.9783$, $D_{39}=\pm7.2564$, $D_{40}=\pm7.5470$, $D_{41}=\pm7.8540$, $D_{42}=\pm8.1831$, $D_{43}=\pm8.5398$, $D_{44}=\pm8.9274$, $D_{45}=\pm9.3474$, $D_{46}=\pm9.8084$, $D_{47}=\pm10.3423$, $D_{48}=\pm11.0091$, $D_{49}=\pm11.8083$, and $D_{50}=\pm12.5000$.

14. In a telephone station system, an array of acoustic transducers to be utilized as a transmitter

CHARACTERIZED BY said acoustic transducers being arranged in pairs symmetrically about a central point of the array, and the distances, in wavelengths, from the center to each member of said pairs being given by $D_1=\pm0.0677$, $D_2=\pm0.2260$, $D_3=\pm0.4308$, $D_4=\pm0.6426$, $D_5=\pm0.8231$, $D_6=\pm0.9767$, $D_7=\pm1.1443$, $D_8=\pm1.8881$, $D_9=\pm1.6663$, $D_{10}=\pm1.8687$, $D_{11}=\pm2.0697$, $D_{12}=\pm2.5321$, $D_{13}=\pm2.8251$, and $D_{14}=\pm3.5000$.

15. An acoustic array of variably spaced microphone elements

CHARACTERIZED IN THAT each of said microphones is spaced from the center of said array by a distance $D_i$ where $D_i$ is determined by the recursive formula:

$$D_i=D_i'-2KR\text{Sin}(2\pi D_i'\text{Sin}J)$$

in which $D_i'$ = spacing derived from the previous iteration.

J = angle of response, varied over 360 degrees for each iteration.

R = array response at angle J.

K = % change in response R due to last change in spacing.

16. A conference microphone array having disc-shaped response pattern

CHARACTERIZED BY a plurality of microphone elements disposed colinearly at nonuniform distances from the center line of said array, and said distances being determined by successively adjusting arbitrary initial distances so as to provide sidelobes in said response pattern having at least two regions of substantially different amplitudes.

17. A conference microphone array having disc-shaped response pattern

CHARACTERIZED BY a plurality of microphone elements disposed colinearly at nonuniform distances from the center line of said array, and said distances being determined by successively perturbating initial distances using far field response criteria to reduce sidelobe amplitudes below a preselected maximum arbitrarily shaped envelope.

18. A colinear arrangement of 28 microphones of substantially equal sensitivities

CHARACTERIZED IN THAT pairs of said microphones are located symmetrically about a center line of the arrangement, and the distances, in wavelengths, from the center line to members of each pair is given by:

$D_1=\pm0.0850$, $D_2=\pm0.2514$, $D_3=\pm0.4097$, $D_4=\pm0.5689$, $D_5=\pm0.7476$, $D_6=\pm0.9491$, $D_7=\pm1.1513$, $D_8=\pm1.3413$, $D_9=\pm1.5385$, $D_{10}=\pm1.8412$, $D_{11}=\pm2.0280$, $D_{12}=\pm2.3379$, $D_{13}=\pm2.7751$, $D_{14}=\pm3.5000$.

19. A colinear arrangement of 28 microphones of substantially equal sensitivities

CHARACTERIZED IN THAT pairs of said microphones are located symmetrically about a center line of the arrangement, and the distances, in wavelengths, from the center line to members of each pair is given by:

$D_1=\pm0.0804$, $D_2=\pm0.2580$, $D_3=\pm0.4601$, $D_4=\pm0.6579$, $D_5=\pm0.8372$, $D_6=\pm1.0129$, $D_7=\pm1.2205$, $D_8=\pm1.4691$, $D_9=\pm1.7076$, $D_{10}=\pm1.9268$, $D_{11}=\pm2.1986$, $D_{12}=\pm2.5974$, $D_{13}=\pm2.9634$, $D_{14}=\pm3.5000$.

* * * * *